Figure 1:
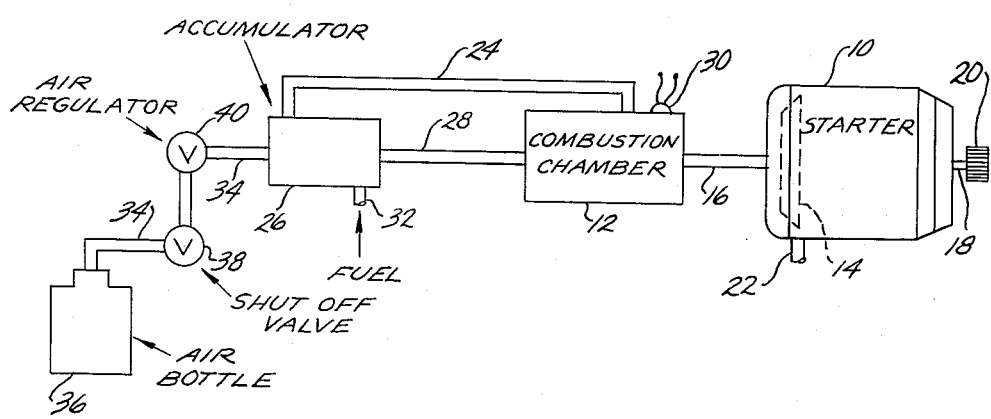

June 6, 1961 E. K. MOORE 2,986,881
FUEL ACCUMULATOR FOR AIRCRAFT JET ENGINE STARTER
Filed April 23, 1958

INVENTOR.
EARL K. MOORE
BY
Teller + McCormick
ATTORNEYS

United States Patent Office 2,986,881
Patented June 6, 1961

2,986,881
FUEL ACCUMULATOR FOR AIRCRAFT JET ENGINE STARTER
Earl K. Moore, Granby, Conn., assignor to United Aircraft Corporation, East Hartford, Conn., a corporation of Delaware
Filed Apr. 23, 1958, Ser. No. 730,292
6 Claims. (Cl. 60—39.14)

This invention relates to an accumulator for storing and discharging a fluid under pressure and, more specifically, to an accumulator of this general type which is particularly adaptable for use in supplying fuel to an aircraft jet engine starter of the combustion type.

It is the general object of the invention to provide an accumulator for storing a fluid and for discharging a first-predetermined quantity of the fluid and for thereafter discharging a second predetermined quantity of the fluid.

Another object of the invention is to provide an accumulator of the type described wherein the first predetermined quantity of fluid is discharged at a preselected rate and wherein the second predetermined quantity of fluid is discharged at a second preselected rate.

A further and a more specific object of the invention is to provide a fuel accumulator which is adapted to supply both fuel and air to the combustion chamber of an aircraft jet engine starter and which is operable first to supply a predetermined quantity of fuel to the combustion chamber and thereafter to supply air and a second predetermined quantity of fuel to said combustion chamber.

The drawing shows a preferred embodiment of the invention and such embodiment will be described, but it will be understood that various changes may be made from the construction disclosed, and that the drawing and description are not to be construed as defining or limiting the scope of the invention, the claims forming a part of the specification being relied upon for that purpose.

Figure 2:
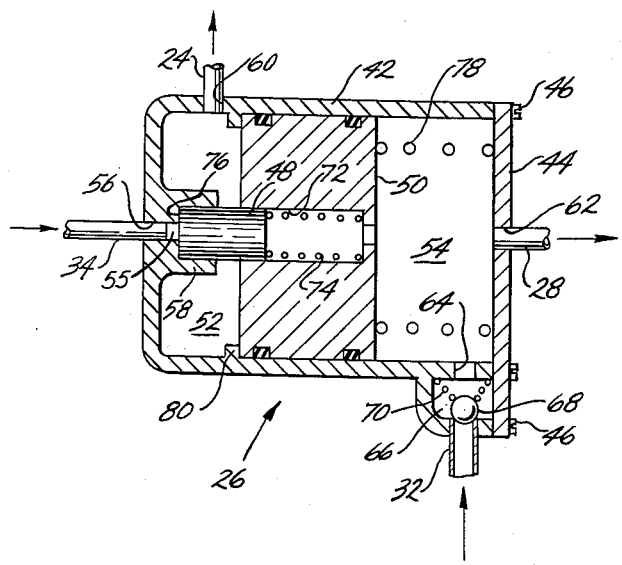

Of the drawing:

FIG. 1 is a schematic illustration of an aircraft jet engine starter and the principal components of a fuel supply system therefor including an accumulator constructed in accordance with the present invention; and FIG. 2 is a vertical sectional view showing a preferred construction of the accumulator included in the starter fuel supply system shown in FIG. 1.

Generally speaking, the accumulator of the present invention includes piston means reciprocable within a housing wherein there is defined an actuating chamber and a storage chamber. An inlet passageway is provided for the actuating chamber and is adapted to be connected to a source of fluid under pressure, and a discharge port is provided for the storage chamber. The piston means of the accumulator is adapted to be moved responsive to fluid pressure in the inlet passageway for the actuating chamber to establish communication between said passageway and chamber and to discharge a predetermined quantity of fluid from the storage chamber, and said piston means is further adapted to be moved thereafter responsive to fluid pressure in the actuating chamber to discharge a second predetermined quantity of fluid from the storage chamber.

While the invention is not to be construed as so limited, the accumulator is particularly adaptable for use in connection with an aircraft jet engine starter for supplying fuel to a combustion chamber associated with the starter. When the accumulator is utilized with an aircraft jet engine starter, a liquid or gaseous fuel is contained in the storage chamber thereof and an inlet port for said chamber is preferably provided in addition to the discharge port therefor so that fuel may be introduced to said chamber from a fuel reservoir. The fluid supplied to the inlet passageway of the accumulator actuating chamber is preferably pressurized air and the accumulator may be adapted to supply said air to the starter combustion chamber. When the accumulator is so adapted, a discharge port is provided for the actuating chamber thereof and the air under pressure supplied to said actuating chamber is discharged through said port for supply to said combustion chamber.

FIG. 1 shows a typical fuel supply system for an aircraft jet engine starter 10 which has associated therewith a combustion chamber 12. The starter 10 includes a turbine 14 which is adapted to be driven by hot combustion gases supplied to the starter through a conduit 16 extending therefrom to the combustion chamber 12. A gear train included within the starter 10, but not shown, serves to transmit the energy derived from the combustion gases by the turbine 14 to a starter output shaft 18 which has an output drive gear 20 mounted thereon. A clutch mechanism, also not shown, may be provided in the starter 10 for reducing shock loading effects on the starter gear train and on a system of gears in the aircraft engine which is driven by the starter output gear 20. An exhaust port 22 provided in the starter 10 discharges the combustion gases overboard of the aircraft after expansion of said gases over the starter turbine 14.

The combustion chamber 12 is adapted to receive air from a conduit 24 extending therefrom to an accumulator 26 which is constructed in accordance with the present invention. Said combustion chamber is also adapted to receive a supply of fuel from a conduit 28 which extends therefrom to the accumulator 26. Suitable fuel atomizing means is provided in the combustion chamber 12 for facilitating mixing of fuel and air therein and associated with said chamber is an igniter 30. The igniter 30 may be operable under the direct control of the aircraft pilot or may be indirectly controlled by the pilot in a manner to be described more fully hereinafter.

Fuel is supplied to the storage chamber of the accumulator 26 through a conduit 32 extending therefrom. The conduit 32 may be connected at the opposite end thereof with the fuel reservoir for the aircraft jet engine, not shown, or, when jet engine starter is not adapted to utilize the same fuel that is used by the engine, the conduit 32 may be connected to a specially provided fuel reservoir. Air under pressure is supplied to the inlet passageway of the actuating chamber of the accumulator 26 through a conduit 34 which extends from said accumulator to an air bottle 36. Disposed in the conduit 34 is a shutoff valve 38 and an air pressure regulating valve 40. The shutoff valve 38, which may be of the solenoid-operated type, is preferably operable for opening and closing movement thereof by the aircraft pilot. The air pressure regulator 40 may be of any well-known type which is operable to maintain air pressure downstream thereof at a substantially constant level.

It will be seen that the shutoff valve 38 and the igniter 30 control operation of the fuel supply system for the starter 10 and thereby control the operation of said starter. When the valve 38 is opened allowing air to pass from the air bottle 36 through the conduit 34 and the air regulator 40 to the accumulator 26, fuel will be discharged from said accumulator to the combustion chamber 12. With the accumulator adapted as shown with the air therefrom being discharged to the conduit 24, air will also be supplied to the combustion chamber 12. After mixture of the fuel and air in the combustion chamber 12 and operation of the igniter 30 to burn said mixture, the hot gases of combustion will be directed to the starter 10 whereupon said starter will operate to accelerate the jet engine as required for starting thereof. When the valve 38 is closed, the starting operation will be terminated, the air supply to the accumulator being thereby interrupted causing interruption in the supply of fuel and air to the combustion chamber 12.

In addition to the components of the starter and the fuel supply system therefor which are shown and described above, the majority of jet engine starting systems include automatic control means operable to regulate operation of the starter. Since, however, the present invention does not relate to such control means, it will suffice to point out herein that there may be provided means for automatically opening the shutoff valve 38 and for simultaneously energizing the igniter 30 which means are operable responsive to a pilot demand for starting operation of the aircraft engines. There may also be provided means for automatically terminating the starting operation and such means may take the form of centrifugally operated switching means operable to automatically close the shutoff valve 38 and de-energize the igniter 30 when the speed of the starter output shaft and drive gear has reached a preselected level. Safety devices such as pressure responsive switches operable to close the shutoff valve 38 and de-energize the igniter 30 upon the occurrence of excessively high or excessively low pressures in the combustion chamber may also be provided to insure termination of the starting operation in the event of malfunction in the fuel supply system or the starter.

Referring now to FIG. 2 wherein there is shown a preferred construction of the accumulator 26, it will be seen that a generally cylindrical housing 42 having one end thereof open is provided. An end plate 44 is provided for closing the open end of the housing 42 and may be attached to said housing by suitable screws 46, 46. The piston means reciprocable within the accumulator housing 42 comprises, in preferred form, a first piston 48 and a second piston 50. Defined within the housing 42 by the pistons 48 and 50 and said housing is an actuating or air chamber 52. Also defined within the housing 42 by the pistons 48 and 50 and said housing, including the end plate 44 thereof, is a storage or fuel chamber 54.

The air chamber 52 is preferably formed adjacent the closed end of the accumulator housing 42, as shown, and an inlet passageway 55 therefor is preferably provided in the closed end of said housing, an opening 56 formed approximately at the center of said closed end constituting first portion of said inlet passageway. Adjacent the opening 56 in the housing 42, there is preferably formed an inwardly and axially extending annular flange 58, a second portion of the inlet passageway 55 for the air chamber 52 being defined thereby. Extending into the opening 56 in the housing 42 is an end of the conduit 34 which communicates with the air bottle 36 and in which are disposed the shutoff valve 38 and the air regulator 40. The discharge port for the air chamber 52 of the accumulator 26 is preferably located in a side of the accumulator housing 42 near the closed end thereof, an opening 60 formed in said housing constituting said discharge port. One end of the conduit 24 which is adapted to supply air to the combustion chamber 12 may be extended into the opening 60 in the housing 42.

The discharge port for the storage or fuel chamber 54 of the accumulator, in the preferred construction thereof, is an opening 62 formed in the housing end plate 44. Extending into the opening 62 in said end plate is one end of the conduit 28 which is connected at its other end to the combustion chamber 12 for the supply of fuel thereto. To provide an inlet port for the storage chamber 54 of the accumulator, an opening 64 is formed in the housing 42 near the open end thereof. Externally of the opening 64, there is preferably provided a small chamber 66 adapted to receive a ball-type check valve 68 and a small biasing spring 70. The chamber 66 is preferably defined by an outwardly and axially extended portion of the housing 42 and by a portion of the end plate 44. One end of the fuel supply conduit 32 communicates with the chamber 66 and the check valve 68 is urged against said conduit end by the biasing spring 70.

When fuel is to be introduced to the chamber 54 through the conduit 32, the check valve 68 is moved to open the end of the conduit 32 by the pressure of the fuel in said conduit whereupon fuel is allowed to flow through the valve chamber 66, the opening 64 and to the fuel chamber 54. On the other hand, during discharge of fuel from the chamber 54 through the conduit 28, the pressure of the fuel in said chamber is increased whereby to cause the check valve 68 to be moved against the end of the conduit 32 so as to prevent the flow of fuel through said conduit in a reverse direction from the chamber 54 to the fuel reservoir.

The piston 50 disposed within the housing 42 of the accumulator is preferably provided with an axial opening 72 which extends therethrough and which is adapted to receive the piston 48 for relative reciprocable movement therein. Thus, the pistons 48 and 50 are reciprocable in the housing 42 and are reciprocable with respect to each other. A small radially and inwardly extending annular flange is preferably provided at one end of the opening 72 in the piston 50 and serves as a seat for a light spring 74 which is disposed in said piston opening. The spring 74 is adapted to engage the piston 48 and to urge said piston leftwardly out of the opening 72 in the piston 50 and toward the closed end of the housing 42.

The piston 48 is operable to open and close the inlet passageway 55 for the air chamber 52 and is preferably adapted for reciprocable movement in the second portion of said passageway defined by the flange 58 adjacent the opening 56 which constitutes the first portion of said passageway. A shoulder 76 is preferably formed internally on the flange 58 for limiting the leftward or inlet passageway closing movement of said piston therewithin and said flange is suitably sized so as to receive and approximately fit a portion of the piston 48 for sliding movement therewithin. Thus, the spring 74 in the opening 72 in the piston 50 urges the piston 48 in a suitable direction for closing the inlet passageway 55 for the air chamber 52. A spring 78 disposed in the fuel chamber 54 urges the piston 50 leftwardly and in the same direction as the spring 74 urges the piston 48. To limit the leftward movement of the piston 48, there is preferably provided a small stop abutment 80 formed on the housing 42.

The pistons 48 and 50 are shown in the respective positions which they occupy when the fuel chamber 54 and the opening 72 in the piston 50 are filled with fuel and when air under pressure is not supplied to the inlet passageway 55 of the air chamber 52 through the conduit 34. When the shutoff valve 38 is opened allowing air to flow through the conduit 34 to the inlet passageway 55 of the actuating chamber 52, the piston 48 is urged rightwardly by fluid pressure in said passageway to cause a predetermined qauntity of fuel to be discharged from the storage chamber 54 through the conduit 28. When the piston 48 has been moved rightwardly past the right-hand end of the flange 58, and out of the passageway 55, the said passageway is opened to allow air from the conduit 34 to enter the actuating chamber 52. Movement of the piston 50 toward the right will then commence and additional fuel will be discharged through the conduit 28. Discharge of air from the chamber 52 through the conduit 24 will, of course, also commence when air from the conduit 34 is introduced to said chamber.

From the foregoing, it will be seen that the piston 48 is movable responsive to air pressure in the inlet passageway 55 to open said passageway and admit pressurized air to the air chamber 52 and to discharge a first predetermined quantity of fuel from the fuel chamber 54 for supply to the combustion chamber 12 and that the piston 50 is movable thereafter responsive to air pressure in the chamber 52 to discharge a second predetermined quantity of fuel from the chamber 54 for supply to said combustion chamber. It will be further seen that when the air supplied to the inlet passageway 55 of the air chamber 52 is maintained at a substantially constant pressure level, as in the preferred construction described above, a first predetermined quantity of fuel will be discharged from the chamber 54 at a preselected rate and a second predetermined quantity of fuel will be discharged thereafter at a second preselected rate. The rates of discharge will be principally determined by the respective effective areas of the pistons 48 and 50 and the level at which the air pressure acting thereon is maintained, it being apparent that with the presently preferred construction, the rate of discharge of the first quantity of fuel will be considerably lower than that of the second quantity of fuel since the piston 48 has an effective area considerably smaller than that of the piston 50.

The significance of the mode of operation of the accumulator whereby a first predetermined quantity of fuel is supplied thereby to the combustion chamber prior to the supply thereby of air and a second predetermined quantity of fuel to said combustion chamber is to be noted. It has been found that increased efficiency of ignition may be obtained in a jet engine starter combustion chamber when there is initially provided therein a fuel-rich mixture and the fuel air ratio is thereafter progressively decreased. By preceding the supply of air to the combustion chamber with the supply of a predetermined quantity of fuel, the accumulator assures that there will be initially provided in said chamber a desired fuel-rich mixture. Thereafter, as air and the second predetermined quantity of fuel are supplied to the combustion chamber by said accumulator, the ratio of the amount of fuel to the amount of air therein is progressively decreased as required for efficient combustion.

The invention claimed is:

1. In combination with a combustion chamber and a source of air under pressure, an accumulator for storing a quantity of fuel and for supplying said fuel and air under pressure to the combustion chamber comprising, a housing, a piston means reciprocable in the housing and defining therewith an air chamber and a fuel chamber, means defining an inlet passageway for said air chamber connectible with said source of air under pressure which passageway is adapted to be opened and closed by said piston means, means defining a discharge port for said air chamber connectible with said combustion chamber, and means defining a discharge port for said fuel chamber connectible with said combustion chamber, said piston means being movable responsive to air pressure in said inlet passageway to first discharge a predetermined quantity of fuel from said fuel chamber for supply to said combustion chamber and to then establish communication between said passageway and said combustion chamber through said air chamber to supply air to the combustion chamber, and said piston means being movable thereafter responsive to the pressure of air flowing through said air chamber to discharge a second predetermined quantity of fuel from said fuel chamber for supply to said combustion chamber.

2. In combination with a combustion chamber and a source of air at a substantially constant pressure, an accumulator for storing a quantity of fuel and for supplying said fuel to the combustion chamber comprising, a housing, piston means reciprocable in the housing and defining therewith an air chamber and a fuel chamber, means defining an inlet passageway for said air chamber connectible with said source of substantially constant pressure air, means defining a discharge port for said air chamber connectible with said combustion chamber, and means defining a discharge port for said fuel chamber connectible with said combustion chamber, said piston means being movable responsive to pressure in said inlet passageway to first discharge a predetermined quantity of fuel at a preselected rate from said fuel chamber for supply to said combustion chamber and to then establish communication between said passageway and said combustion chamber through said air chamber to supply air to the combustion chamber, and said piston means being movable thereafter responsive to air pressure in said air chamber to discharge a second predetermined quantity of fuel at a second preselected rate from said fuel chamber for supply to said combustion chamber.

3. In combination with a combustion chamber and a source of air under pressure, an accumulator for storing a quantity of fuel and for supplying said fuel to the combustion chamber comprising, a housing, first and second pistons reciprocable in the housing and reciprocable with respect to each other which pistons cooperate with said housing to define an air chamber and a fuel chamber, means defining an inlet passageway for said air chamber connectible with said source of air under pressure which passageway is adapted to be opened and closed by movement of said first piston, means defining a discharge port for said air chamber, means defining a inlet port for said fuel chamber connectible with a source of fuel, and means defining a discharge port for said fuel chamber connectible with said combustion chamber, said first piston being movable responsive to air pressure in said inlet passageway to establish communication between said passageway and said air chamber and to discharge a predetermined quantity of fuel from said fuel chamber for supply to said combustion chamber, and said second piston being movable thereafter responsive to the pressure of air flowing through said air chamber to discharge a second predetermined quantity of fuel from said fuel chamber for supply to said combustion chamber.

4. In combustion with a combustion chamber and a source of air under pressure, an accumulator for storing a quantity of fuel and for supplying said fuel to the combustion chamber comprising, a first piston, a second piston having an axial opening therethrough adapted to receive said first piston for relative reciprocable movement therein, a housing for said first and second pistons cooperating therewith to define an air chamber and a fuel chamber, an inlet passageway for said air chamber formed in said housing connectible with the source of air under pressure which passageway is adapted to be opened and closed by movement of said first piston, a discharge port for said air chamber formed in said housing, an inlet port for said fuel chamber formed in said housing connectible with a source of fuel, and a discharge port for said fuel chamber formed in said housing connectible with said combustion chamber, said first piston being movable responsive to pressure in said inlet passageway to open the same and admit pressurized air to said air chamber therefrom and to discharge a predetermined quantity of fluid from said fuel chamber for supply to said combustion chamber, and said second piston being movable thereafter responsive to the pressure of air flowing through said air chamber to discharge a second predetermined quantity of fuel from said fuel chamber for supply to said combustion chamber.

5. In combination with a combustion chamber and a source of air under pressure, an accumulator for storing a quantity of fuel and for supplying said fuel to the combustion chamber comprising, a first piston, a second piston having an axial opening therethrough adapted to receive said first piston for relative reciprocable movement therein, a housing for said first and second pistons cooperating therewith to define an air chamber and a fuel chamber, an inlet passageway for said air chamber formed in said housing connectible with the source of air under pressure which passageway is adapted to be opened and closed by movement of said first piston, a discharge port for said air chamber formed in said housing, an inlet port for said fuel chamber formed in said housing connectible with a source of fuel, a discharge port for said fuel chamber formed in said housing connectible with said combustion chamber, and first and second spring means respectively for urging said first piston in one direction for closing said air chamber inlet passageway and for urging said second piston in the same direction, said first piston being movable responsive to pressure in said inlet passageway against the urging of said first spring means to open said passageway and to discharge a predetermined quantity of fluid from said fuel chamber for supply to said combustion chamber, and said second piston being movable thereafter responsive to the pressure of air flowing through said air chamber against the urging of said second spring means to discharge a second predetermined quantity of fuel from said fuel chamber for supply to said combustion chamber.

6. An accumulator for storing and discharging a fluid under pressure and comprising, a housing, first and second pistons reciprocable in the housing and reciprocable with respect to each other which pistons cooperate with said housing to define an actuating chamber and a storage chamber, means defining an inlet passageway for said actuating chamber which is connectible with a source of fluid under pressure and which is adapted to slidably receive said first piston so as to be opened and closed with respect to said actuating chamber by reciprocable movement of said piston, means defining a discharge port for said storage chamber, and first and second resilient biasing means respectively urging said first piston in one direction and into said inlet passageway for preventing fluid flow from said passageway to said actuating chamber and for urging said second piston in the same direction, said first piston being acted on by pressurized fluid in said inlet passageway in opposition to said first biasing means so as to be moved out of and to open said passageway whereby to admit fluid under pressure to said actuating chamber and to discharge a predetermined quantity of fluid from said storage chamber, and said second piston being movable thereafter responsive to pressure in said actuating chamber in opposition to said second biasing means to discharge a second predetermined quantity of fluid from said storage chamber.

References Cited in the file of this patent

UNITED STATES PATENTS

| | | |
|---|---|---|
| 710,130 | Weiss | Sept. 30, 1902 |
| 763,833 | Albree | June 28, 1904 |
| 1,980,617 | Engel | Nov. 13, 1934 |
| 2,667,035 | Marsden | Jan. 26, 1954 |
| 2,814,252 | Volk | Nov. 26, 1957 |
| 2,921,431 | Sampietro | Jan. 19, 1960 |

FOREIGN PATENTS

| | | |
|---|---|---|
| 717,100 | Great Britain | Oct. 20, 1954 |